Dec. 13, 1938.    N. GARCIA    2,139,677

LUBRICATING DEVICE

Filed April 12, 1935    3 Sheets-Sheet 1

WITNESSES:

INVENTOR.
Nestor Garcia

Dec. 13, 1938.  N. GARCIA  2,139,677
LUBRICATING DEVICE
Filed April 12, 1935   3 Sheets-Sheet 2
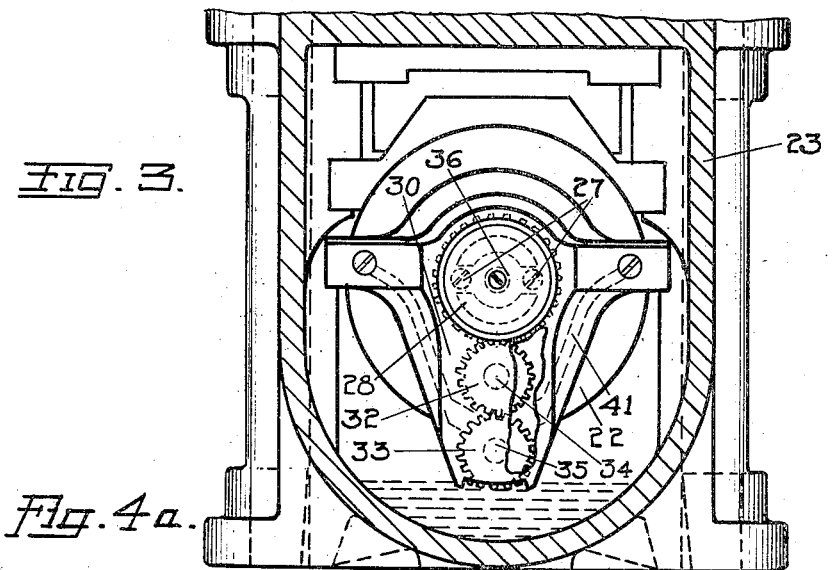
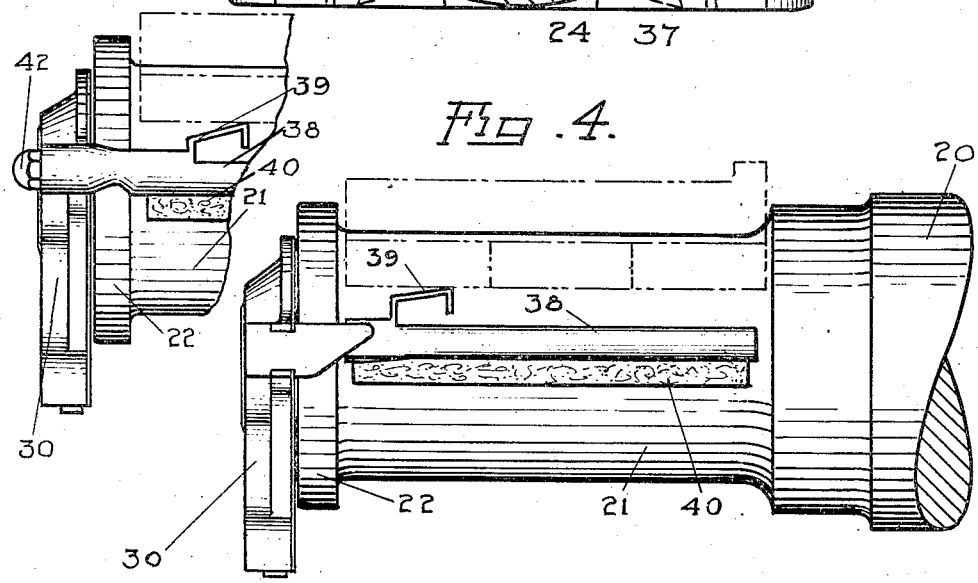

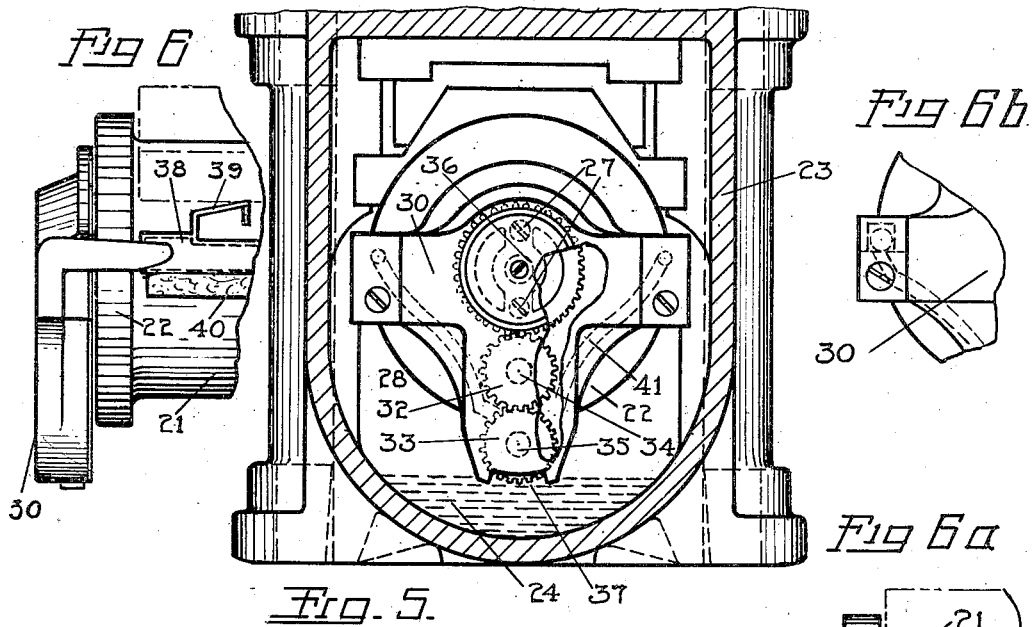
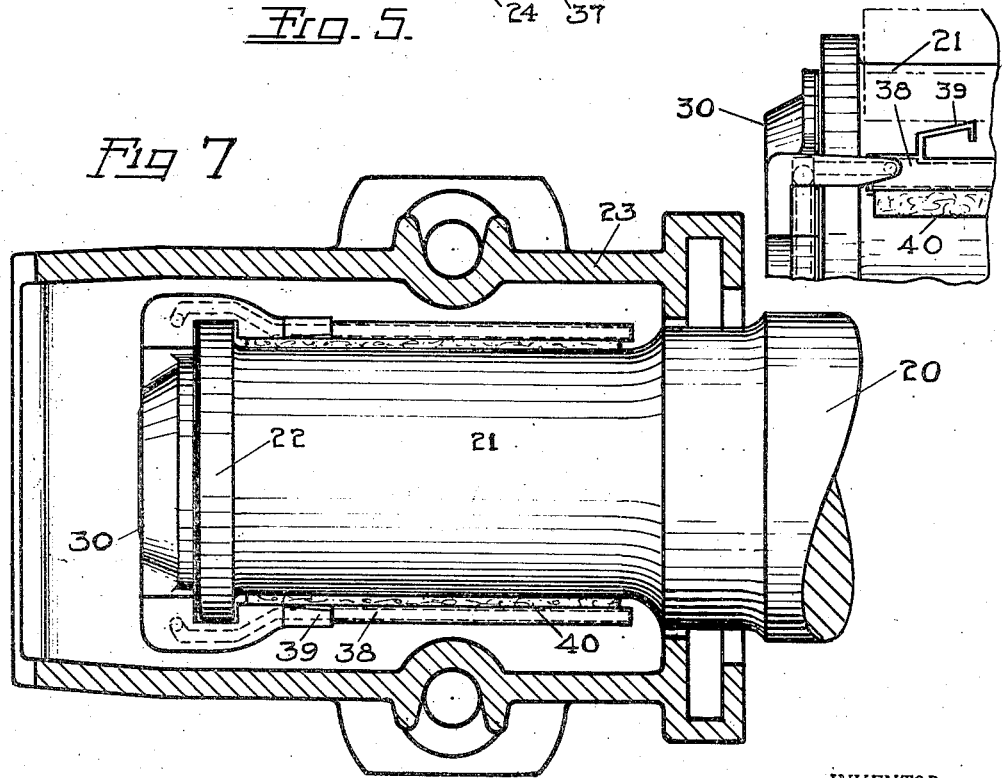

Patented Dec. 13, 1938

2,139,677

UNITED STATES PATENT OFFICE 2,139,677

LUBRICATING DEVICE

Nestor Garcia, New York, N. Y., assignor to Pastor R. Pelayo, New York, N. Y.

Application April 12, 1935, Serial No. 16,006

2 Claims. (Cl. 308—84)

This invention relates to lubricating devices.

The invention has been worked out in connection with journal bearings, with particular reference to journal bearings for railway trucks, where the journal and journal bearings are subjected to very severe usage, hard wear and where it is essential that they be sufficiently lubricated at all times.

The salient objects of the invention are to provide a simple, practical and efficient lubricating device that can be readily applied to standard journal bearing structures.

Another object of the invention is to provide a lubricating device that can easily be inspected, repaired and replaced.

Another object of the invention is to provide a lubricating device that will furnish a continuous flow of lubricant to the journal and journal bearing whenever the axle, shaft or journal is rotating.

Another object of the invention is to provide a simple and practical lubricating device that will positively and continuously feed a film or stream of lubricant to the parts to be lubricated.

Another object of the invention is to provide a means arranged to act as a reservoir or storage, insuring the presence of lubricant on the axle, shaft or journal and journal bearing when the lubricating device starts in operation.

Another object of the invention is to provide a means of distributing the lubricant uniformly over the journal to insure uniform lubrication to the working parts in contact and return the surplus lubricant to the oil sump.

Further objects of the invention will appear in this specification taken in connection with the drawings, which form a part of this application, and in which:—

Figure 3 is a transverse section of a journal box, taken at right angles to Figure 1 and approximately on the line 3—3, showing the axle, shaft or journal with the lubricating device attached thereto.

Figure 4 is a side elevation of the axle, shaft or journal, with lubricating device mounted thereon.

Figure 4a is a side elevation similar to Figure 4 but illustrating a slightly different embodiment of the invention with reference to the lubricator feed arm means of attachment.

Figure 5 is a transverse section taken at right angles to Figure 1 and similar to Figure 3 but illustrating a slightly different embodiment of the invention with reference to the feed arm means of attachment and case to conform, and is taken approximately on the line 3—3, Figure 1.

Figure 6 is a side elevation of the axle, shaft or journal and lubricating device mounted thereon, showing the lubricator feed arm means of attachment as described in Figure 5.

Figure 6a is a side elevation, broken away, of the lubricator feed arm and assembly, similar to Figure 6, but illustrating a slightly different embodiment of the invention, with reference to a ball valve as indicated and which is described in detail in another part of this specification to follow.

Figure 6b is a part front elevation of the lubricator feed arm and assembly Figure 6a, showing ball valve.

Figure 7 is a transverse section of the structure shown in Figure 1, the top of the journal box cut away, cover plate not shown so that the lubricating device, axle, shaft or journal and position of assembly in the journal box can be plainly seen also indicating the means of attachment of the lubricator feed arms.

Figure 1:
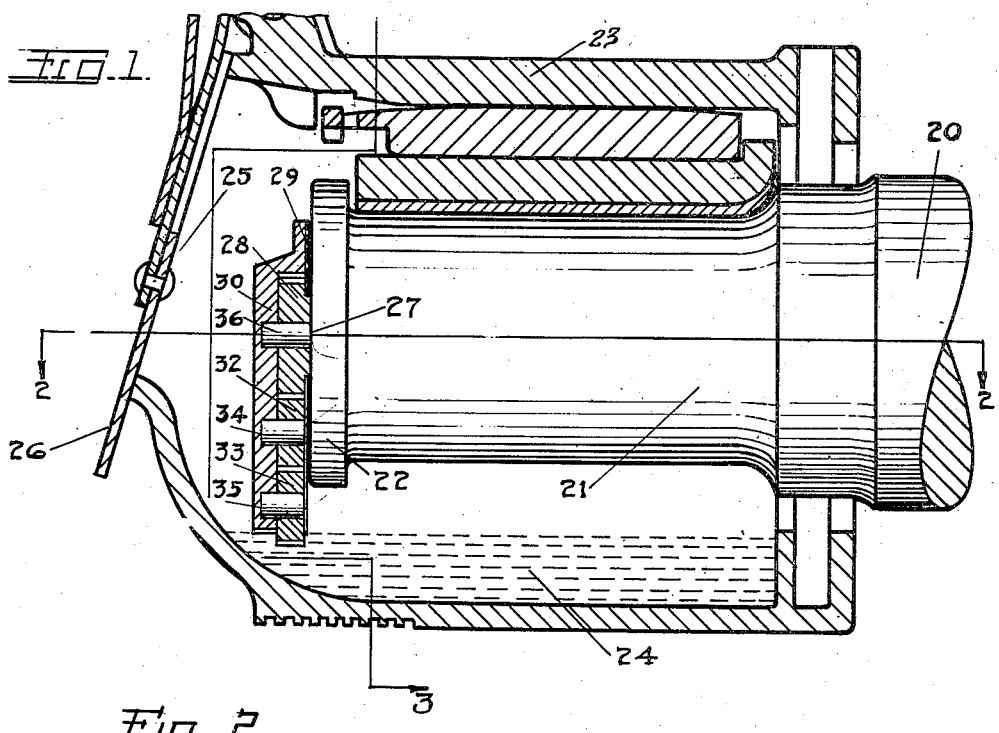
Figure 1 is a longitudinal section through a journal box and lubricating device showing the end of a railway car axle with the lubricating device attached thereto in accordance with the invention, and approximately on the line 1—1 of Figure 2.

The invention, briefly described, consists of a lubricating device adapted to conduct the oil from the oil sump in the journal box to the axle or shaft journal and journal bearing.

The lubricating device is preferably mounted on the end of the journal axle or shaft and comprises a bracket case supported on the axle or shaft and having mounted therein a series of three gears, one of which is fixed to the journal axle or shaft, supporting the casing off its hub and driving the idler and third gear, the third gear dipping into the lubricant in the sump and conducting the lubricant up between the third gear and idler gear. The lubricant is then squeezed out of the intermeshing idler and third gear, being forced up through the channel to the lubricator feed arm, out through the holes in the lubricator feed arm to the lubricator reservoir storage wiper and then distributed evenly over the journal in a continuous flow or film.

The distribution of the lubricant over the entire length of the journal and journal bearing is further assured by means of the wiper being built into the lubricator feed arm, extending out there from and in constant contact with the axle or shaft journal forming a reservoir storage and insuring an initial lubrication of the journal and journal bearing before the gear pump or lubricant supplying means starts to function when journal axle or shaft starts to rotate.

Further details of the invention will appear from the following specification:—

In the form of the invention shown in the drawings, there is illustrated a railway car journal, axle or shaft 20, having a journal 21 formed thereon. A flange 22 is formed on the end of the journal axle or shaft 20.

The axle extends into the journal box 23, of the usual construction, having an oil well or sump 24.

The journal box 23 has an opening 25, which is normally closed by a spring pressed cover 26, of the usual construction.

The invention in the form illustrated in Figures 1 to 7 inclusive has two screws 27, securing the fixed lubricating device drive gear 28 to the journal end of axle or shaft 20, which is drilled and tapped to receive same.

The back plate of the lubricating device 29 is set between the drive gear 28 and the end of the axle or shaft 20, and is fitted over a hub, an integral part of and extending out from the gear 28, the hub being slightly extended from the back plate to give clearance so that the shaft can run free from the casing back plate 29, without friction. The lubricating device casing 30 is fitted to plate 29 by means of flat head machine screws through back plate 29, to lubricating device casing at outer edges 30, enclosing drive gear 28, idler 32, and the end oil pick up gear 33.

The drive gear 28 is mounted on stud 36, the idler gear 32 is mounted on stud 34, and the pick up gear 33 is mounted on stud 35, the studs 36, 34 and 35 being a part of the casing 30.

The casing and plate 30 and 29 are cut away as shown at 37, to allow the lubricant in the sump 24 to enter the teeth of the gear 33, to be carried upward to and between gears 32 and 33, to channel as shall be described.

The casing is formed (casing 30) with two outward extending arms, to which the feed arms are attached (feed arms 38). Each of the feed arms 38 has a spring stop 39 built to it which fits close to the under side of the bearing but not attached in any way. These springs are to prevent the lubricating device from turning when the axle or shaft is in motion.

From the extending feed arm 38 is built a reservoir storage wiper 40, which is in constant contact with the journal 21, as shown in Figures 4, 4a, 6, 6a, 2 and 7, and which intercepts the lubricant as it is forced out through the holes in the lubricator feed arm 38, and distributes the lubricant evenly over the journal 21 and journal bearing.

The channels 41 are an important feature of this invention as they receive and conduct the lubricant squeezed out from between the gears 32 and 33 up to and through the lubricator feed arm and continuing out through the holes therein to the reservoir storage wiper and finally to the journal and journal bearing.

The lubricating device above described operates as follows:—

When the journal axle or shaft rotates, the gear 28 will also rotate, causing the intermeshing idler gear 32 to rotate and in turn the intermeshing end pick up gear 33 to rotate.

The lubricant in the sump 24 will be picked up by the end pick up gear teeth 33, and will be squeezed out from between gears 32 and 33, and will be forced up through one of the channels, depending upon the rotation of the shaft 20, through the feed arm 38, and ejected from the holes in the feed arm to the reservoir storage wiper.

The reservoir storage wiper is in contact with the journal at all times and distributes the lubricant evenly over the journal and journal bearing.

The reservoir storage wiper is at all times saturated with lubricant so that the lubricant will be furnished to the journal 21 and journal bearing when the axle or shaft starts to rotate, and before the lubricating device pump starts to function.

A continuous flow or film of oil will be fed to the journal and journal bearing whenever the axle or shaft is rotating.

When the axle or shaft is rotating in one direction, the lubricant will be conducted up one channel 41, to the feed arm 38, to reservoir storage wiper 40, then to journal and journal bearing. When the axle or shaft is rotating in the opposite direction, the lubricant will be conducted up channel 41, to feed arm 38 on the other side to reservoir-storage wiper, then to journal and journal bearing.

All parts of the lubricating device are lubricated at all times.

The feed arm in Figure 4a is similar to Figure 4, but illustrates a slightly different embodiment of the invention wherein the means of connection of the feed arm to the lubricator casing is accomplished by extending a tube, threaded on the end and which is a part of the feed arm, through the lug of the casing 30, and securing same by means of a nut 42.

Figure 2:
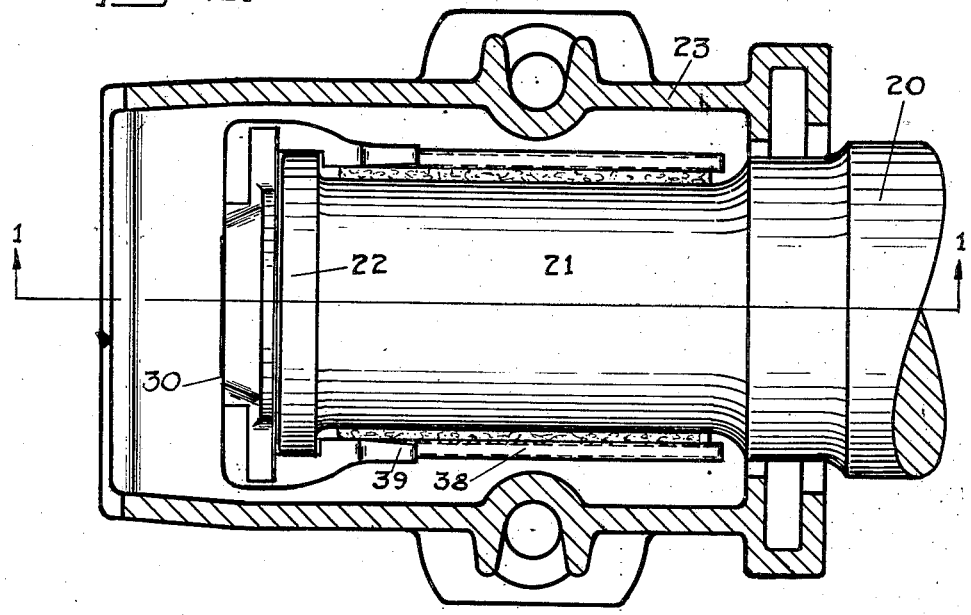
Figure 2 is a transverse section of the structure shown in Figure 1, the top of the journal box cut away, cover plate not shown and is taken approximately on the line 2—2 Figure 1.

Figures 5, 6, and 7, similar to Figures 2, 3, and 4, illustrate a slightly different embodiment of the invention wherein the feed arm means of attachment to casing 30 is accomplished by carrying the feed arm bracket over the top of the casing arm as shown on the drawings instead of the side as shown on Figure 4, and increasing the size of the casing to conform.

The purpose of the ball check valve shown in Figures 6a and 6b, is to retain the vacuum produced by the separation of the teeth of the idler and end pick up gear in the channel opposite the channel feeding the lubricant to the journal 21. This vacuum causes the oil in the sump 24 to be drawn up into the empty spaces between the teeth of the end pick up gear 33, as they leave the cut away portion of the casing 30, and enter the oil in the sump 24, and assuring a maximum supply of oil at all times. When the direction of rotation is reversed, this condition is reversed.

The ball check valve is raised to an open position to allow the free flow of lubricant while the opposite valve is closed causing the vacuum produced to be retained in the channel. When the direction of rotation is changed, this condition is reversed.

What I claim is:—

1. A lubricating device comprising an axle to be lubricated, an oil sump, means for conducting oil from the sump to the axle, said means comprising a casing carried by the axle and extending into the sump, a gear pump in the casing, operatively connected to the axle and driven thereby, conduits in the casing receiving oil discharged by the pump, conduits carried by the casing receiving oil from said casing conduits and conducting oil to the axle, said last named conduits being located on opposite sides of the axle and adjacent the periphery thereof, each of said last named conduits having an absorbent strip receiving oil from the conduit and in wiping engagement with the shaft.

2. A lubricating device comprising an axle to be lubricated, an oil sump, means for conducting oil from the sump to the axle, said means comprising a casing carried by the axle and extending into the sump, a gear pump in the casing, operatively connected to the axle and driven thereby, conduits in the casing receiving oil discharged by the pump, conduits carried by the casing receiving oil from said casing conduits and conducting oil to the axle, said last named conduits being located on opposite sides of the axle and adjacent the periphery thereof, each set of conduits having a check valve therein for checking return flow of oil through the conduit to the sump.

NESTOR GARCIA.